Figure 1:
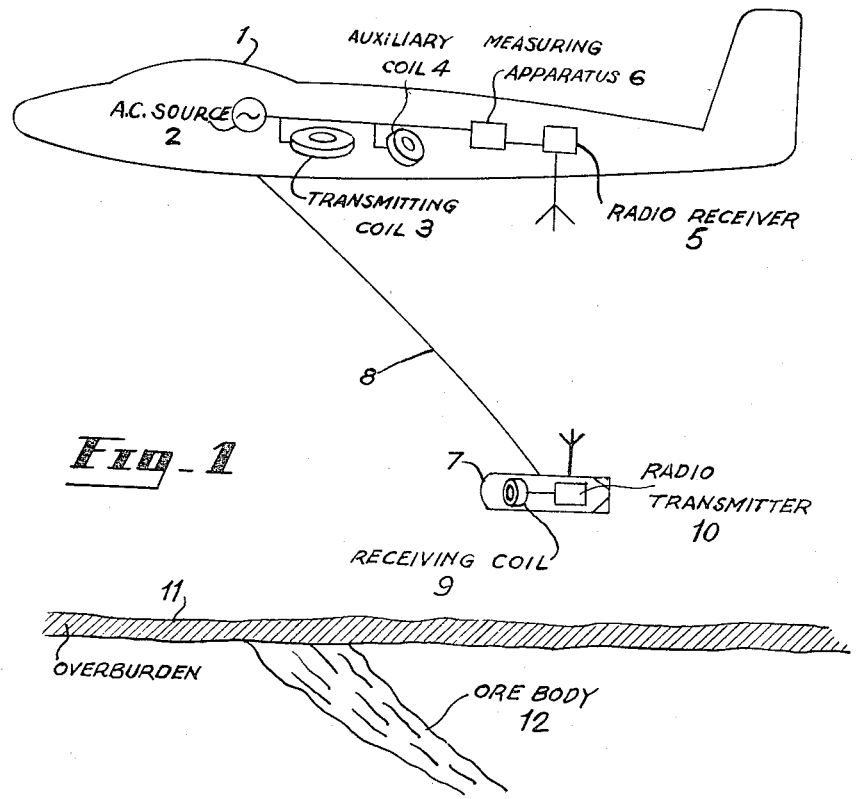

United States Patent Office 2,741,736
Patented Apr. 10, 1956

2,741,736
METHOD FOR INDUCTIVE PROSPECTING

Maunu Puranen and Aarno Assar Kahma, Helsinki, Finland, assignors to Canadian Airborne Geophysics Limited, Toronto, Ontario, Canada Application August 31, 1954, Serial No. 453,371

16 Claims. (Cl. 324—4)

Our invention relates to methods and apparatus for electromagnetic detection of ores and conductive bodies and formations, and more particularly, to an improvement in such methods for inductive prospecting as described, for example, in our U. S. Patent No. 2,642,477.

It is well known in the art that conductive bodies may be detected through the use of a transmitting coil which is energized by an alternating current provided by a generator and which coil thereby produces an alternating electromagnetic field (usually termed the primary field). This field, if of sufficient magnitude and proximity to the conductive body, will cause eddy currents to be induced in that body. These eddy currents create their own electromagnetic field (usually termed the secondary field), which may be detected by a suitable receiving coil and measured and recorded by suitable measuring and recording means. In the prior art, the existence and magnitude of such a secondary field has provided an indication of the presence of conductive bodies. Furthermore and according to the teaching of our earlier patent, the magnitude and ratio of out of phase and in phase components of voltage induced in the receiving coil which may be readily separated and measured by any known means can provide useful information as to the existence and properties of the conductive bodies.

According to the manner of our earlier U. S. Patent No. 2,642,477, two and possibly three transmitting frequencies are employed in order to overcome difficulties associated with the single frequency transmission already outlined, particularly in relation to the detection of such bodies from an aircraft.

In airborne electromagnetic prospecting, the transmitting coil or coils have been, as a rule, because of the large size required for optimum results, located in the aircraft together with the recording, separating, and measuring means, while the receiving coil has been placed in a bird or glider towed beneath and behind the aircraft and as close to the conductive bodies as is possible.

It has been found that in carrying out operations under the methods outlined, a disturbing out of phase voltage component is induced in the receiving coil which is created not by the conductive bodies, which are sought to be detected and measured, but rather by eddy currents induced in the metal mass of the aircraft by the primary field. This component interferes with accurate detection and measurement of the conductive bodies sought.

In addition, at least two electrical conductors are conventionally used between the receiving coil in the bird and the detecting and analyzing means in the aircraft for the transmitted frequency. This results in a relatively thick cable connection, and since this cable connection between aircraft and bird is often up to five hundred feet long, wind resistance and drag on the cable will cause the bird to assume a position behind the aircraft, rather than in the desired perpendicular relationship to the aircraft, and reduces the vertical distance between the aircraft and the bird, thus requiring the aircraft to operate at a lower altitude, in order to have the bird in effective detecting distance from the earth's surface. It is desired that the receiving coil mounted in the bird shall be, in so far as is possible, vertically beneath the transmitting coil, and as close to the conductive body as possible to increase the signal strength from the secondary field as well as the resolving power of the measuring system.

It is an object of our invention, therefore, to provide a method and apparatus for electromagnetic detection of conductive ores and other conductive bodies and formations whereby the effect of the disturbing field caused by eddy currents induced in the metal mass of the aircraft may be eliminated at the receiving coil. It is a further object of our invention to provide a method and apparatus for airborne electromagnetic detection whereby the bird containing the receiving coil may be operated more vertically beneath the aircraft than has heretofore been the case and which will thus permit the receiving coil to be operated with safety more closely to the surface of the ground or water as well as permitting a more precise location of the conductive bodies sought.

It is yet another object of our invention to provide a means whereby the receiving coil or coils towed in the bird may be coupled with the detecting, separating and measuring means in the aircraft without the necessity of employing a plurality of electrical conductors and a consequently thick and expensive cable connection.

The disturbing field caused by eddy currents in the metal mass of the aircraft has a "real" component in phase with the primary field and an "imaginary" component out of phase with the primary field. Similarly the secondary field caused by a conductive ore body or the like has an in phase and an out of phase component. The in phase components of both the disturbing field and of the secondary field induce voltages in the receiving coil but these voltages are small and, being in phase with the voltage induced by the primary field, have negligible effect upon the magnitude and phase angle of the total voltage induced in the receiving coil. These small voltages due to the in phase components of the disturbing and secondary field cannot be measured readily but fortunately they can be neglected. Our invention consists broadly in providing means for rendering the out of phase component of the disturbing field ineffective at the receiving coil, so that the effect of the out of phase component of the secondary field may be sensed.

Our invention also consists in coupling the receiving coil in a bird or glider with detecting, separating or measuring means in the aircraft by means of radio signals, thus making possible the use of a towing wire or cable that is of minimum cross-sectional dimensions so that the bird may hang as nearly vertically below the aircraft as possible.

Figure 2:
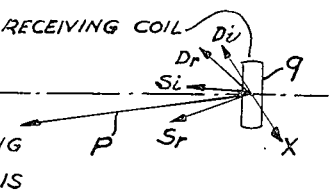
Figure 3:
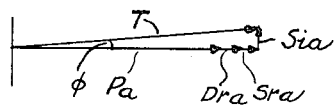

The theory and operation of the invention will now be more fully described, reference being made by way of example to the accompanying drawings in which:

Fig. 1 is a diagrammatic view of an aircraft towing a bird and flying above an ore body;

Fig. 2 is a vector diagram showing special vectors which represent alternating magnetic fields at the location of the receiving coil in the bird, the vectors being shown, for ease of illustration, in two dimensions only, although they will of course normally occupy three dimensions; and Fig. 3 is a vector diagram showing, for the vectors of Fig. 2, the uncancelled components which lie along the axis of the receiving coil, said components being shown in Fig. 3 in their time relationship.

In Fig. 1 is shown an aircraft 1 in which is an alternating current source 2, a transmitting coil 3 connected to the source 2, an auxiliary coil 4 connected to the source 2, a radio receiver 5, and measuring apparatus 6 in circuit with the transmitting coil and the radio receiver. The aircraft tows a bird 7 by means of a tow cable 8, and the bird contains a receiving coil 9 connected to a radio transmitter 10. The aircraft and bird are flying over the earth 11 which contains an ore body 12.

If the frequency employed in the inductive method is relatively low, then the current flowing in the transmitting coil creates in the vicinity of the receiving coil a primary magnetic field P, which is, from a practical standpoint, in the same phase as the current in the transmitting coil. Accordingly, the phase of the voltage induced in the receiving coil by the primary magnetic field remains unchanged in relation to the current in the transmitting coil, even though the positions of the transmitting and receiving coils and the distance between them be changed.

In the event that there are ores in the vicinity, eddy currents are induced in them by the influence of the primary field and these in turn create in the vicinity of the receiving coil a secondary field S. The field S is not generally in the same phase as the field P, having a component $S_r$ in phase with P and a component $S_i$ out of phase with P. The components $S_r$ and $S_i$ are not only out of phase in time but are also normally not in the same direction in space owing to the combined effect of different conducting elements of the ore body, and this is indicated in Fig. 2 which shows typical spatial relations of the field vectors. The total field due to the primary and secondary fields (vector sum $P+S$) is no longer in the same phase as the current in the transmitting coil, and in the voltage induced in the receiving coil by the influence of the two fields there are thus to be observed phase difference anomalies.

When inductive measurements are carried out from an aircraft, masses of metal of considerable size, such as motors, the wings, the fuselage, and so on, are bound to be situated in the immediate vicinity of the transmitting coil. Through the influence of the primary field, eddy currents are induced in these masses of metal (as well as in the ores below) and these currents create a disturbing electromagnetic field D having an in phase component $D_r$ and an out of phase component $D_i$. We shall assume that the distance between the receiving coil and the transmitting coil is many times greater than the maximum dimensions of the transmitting coil and the vehicle carrying it. In that case the transmitting coil and the adjacent masses of metal, together with their eddy currents behave in the manner of magnetic dipoles. In the transmitting coil there flows a "real" current, due to which there arises what we shall call the "real" dipole $M_r$, the moment of which has a specific magnitude and direction. The eddy currents flowing in the adjacent metallic masses have two components: the "real" eddy currents, which are in the same phase as the current of the transmitting coil, and the "imaginary" eddy currents, which are in the phase difference $$\frac{\pi}{2}$$

with respect to the current of the transmitting coil. Viewed from a distance, the total effect of the "imaginary" eddy currents is the same as that of an "imaginary" dipole $m_i$, which has a specific magnitude and direction and the magnetic field created by which is in the phase difference $$\frac{\pi}{2}$$

with respect to the current of the transmitting coil and primary field P created by it. Correspondingly, the influence of the "real" eddy currents may be regarded as resulting from a "real" dipole $m_r$. The dipoles $M_r$, $m_i$ and $m_r$ are not generally parallel in space. When the receiving coil is tilted in different directions, the phase of the voltage induced in the receiving coil, as a consequence of the existence of the "imaginary" dipole $m_i$, changes. Thus, where a phase difference meter 6 is connected to the transmitting and receiving circuits, the reading of the phase difference meter does not remain a constant independent of position even over "neutral" ground, and precise phase anomaly measurements cannot be carried out unless the influence of the "imaginary" disturbing dipole $m_i$, resulting from masses of metal, is somehow eliminated. This eliminating operation may be performed as follows: first, the magnitude and direction of the "imaginary" dipole $m_i$ connected with the vehicle are experimentally measured; then, an auxiliary coil 4 is so constructed that its associated magnetic field X, being equal in magnitude but opposite in direction to $D_i$, cancels the latter, or, to put it another way, the auxiliary coil has the effect of a dipole the moment of which is equal in magnitude but opposite in direction to the moment $m_i$ of the eddy currents, thus cancelling $m_i$. If only a single auxiliary coil is employed, then evidently it must be made possible to regulate both the position of the coil and the amplitude of the "imaginary" component of the current to be conducted through it (the "imaginary" component being in phase difference $$\frac{\pi}{2}$$

with respect to the current of the transmitting coil). In using more than one auxiliary coil (for instance, two or three mutually perpendicular coils), the position of the coils may be fixed and only the "imaginary" components of the currents conducted into them need by subject to regulation. As mentioned above, in practice it is most important to compensate for the "imaginary" disturbing dipole $m_i$ the moment of which is perpendicular to the moment of the transmitting dipole $M_r$, since the angle tilt errors for the most part are caused by it.

The strength of the eddy current dipoles $m_r$ and $m_i$ resulting from the masses of metal near the transmitting coil naturally depends to a great extent on the position of the transmitting coil in relation to the disturbing metallic masses. In operating according to the method of our invention, such a position for the transmitting coil is first sought experimentally that $m_i$ is as small as possible (the disturbing masses of metal must be situated as far as possible from the transmitting coil and, as far as possible, symmetrically in relation to it). For practical reasons, the possibilities of changing the position of a large transmitting coil are quite limited, wherefore that part of the moment of the dipole $m_i$ which is still left must be ultimately compensated for by means of an auxiliary coil or coils.

To explain the theory another way, it will be seen from Fig. 2 that X cancels $D_i$, being of equal magnitude and opposite in direction in space. The effective parts of the uncancelled fields P, $D_r$, $S_r$ and $S_i$ are their components $P_a$, $D_{ra}$, $S_{ra}$, $S_{ia}$ respectively along the axis of the receiving coil, and these components are shown in their time relationship in Fig. 3. The net effective field T at the receiving coil is, for practical purposes, the vector sum of $P_a$, $D_{ra}$ and $S_{ia}$.

In lieu of auxiliary coils of the kind into which current is conducted from a separate generator it is possible to employ other auxiliary conductors, such as conductive loops, metal sheets or masses in which eddy currents are induced through the influence of the primary field. Since it is immaterial whether the current is conducted into the auxiliary conductors by galvanic or inductive coupling, both types of auxiliary conductor are of equal value in the practical application of our invention.

In addition to the foregoing, our invention includes new methods of prospecting from a single aircraft. The transmitter and transmitting coil are carried by the aircraft, but the receiving coil is situated in a streamlined case 7, which is towed at the end of a long, thin cable 8. By suitably shaping the receiving case and making it sufficiently heavy as well as attaching it to a thin towing cable, the cable will hang downward at a fairly steep angle, in spite of air resistance. The receiving coil is thus lowered as near to the surface of the earth as flying safety will permit. The nearer to the surface of the earth the receiving coil can be kept, the stronger and sharper become the electrical anomalies caused by ores. The electrical anomalies particularly of ores situated vertically or of small size become vague and swiftly diminish as the height of the receiving coil from the surface of the terrain increases. In the conventional method, with a towing cable comprising at least two lines, it is possible to transfer the voltage induced in the receiving coil by means of the cable to the aircraft for measurement, and, if found necessary, the said voltage may be sufficiently amplified in advance by a tube amplifier before its transfer into the towing cable.

A multi-wire cable is bound to be fairly large in diameter and this circumstance makes it difficult to lower the cable steeply from a fast aircraft. Hence the cable may be replaced by a single thin steel wire, whereupon the effect of wind resistance is greatly reduced and the towing angle brought nearer the perpendicular. In employing a single strand cable or wire, the transfer to the aircraft of the voltage induced in the receiving coil, for measurement of said voltage, is, according to this invention, performed by radio. For this purpose, a small shortwave battery transmitter 7 may be situated at one end of the streamlined case containing the receiving coil. The shortwave radiation of this set may be modulated by means of the low frequency voltage E induced in the receiving coil. A corresponding shortwave receiving set 5, with which the demodulation may be carried out, is situated in the aircraft. Thus, it is possible to transfer by radio both the phase and the amplitude of the voltage E from the receiving coil to the aircraft.

In practice, our invention may be carried out as follows:

An airborne electromagnetic survey device of any known arrangement of parts comprising a source of alternating current 2 of at least one frequency and at least one transmitting coil 3 together with at least one receiving coil 10 and suitable means 6 for detecting, separating and measuring signals induced in the said receiving coil is operated over a known neutral area, i. e. an area known to be free of conductive bodies or formations. This may best be effected through operation of the aircraft at a sufficiently high altitude that any conductive bodies on the surface of the ground are too remote to cause a signal at the receiving coil. If an induced voltage component is recorded at the receiving coil under these operating conditions, which component is out of phase with the primary field, as will almost invariably be the case, such out of phase component can be created only by the disturbing field induced by eddy currents created in the mass of the aircraft through the influence of the primary field. It is then possible to construct and position an auxiliary coil with relation to the transmitting coil and the metal mass, so that this auxiliary coil, when energized, by means of controlled current, produces a compensating field X at the receiving coil equal in magnitude and opposite in direction to the "imaginary" component $D_i$ of the disturbing field and which, therefore, eliminates the detrimental effect of the "imaginary" component of the disturbing field at the receiving coil.

Such auxiliary coil should be located in close proximity to the metal mass and transmitting coil as compared with the distance between the receiving coil and the metal mass. This juxtaposition results in substantially complete compensation for the "imaginary" component $D_i$ of the disturbing field at the receiving coil irrespective of the variations in the geometrical position of the towed bird with respect to the aircraft, as will inevitably occur in practice.

The auxiliary coil 4 can be energized by a suitable alternating current drawn either from the main generator 2 for the transmitting coil 3, known means being employed to ensure such current being in the appropriate magnitude and phase to effect the required compensation, or from a suitable separate alternating current source. Thus the magnitude, direction and phase of the compensating field induced by said auxiliary coil at the receiving coil will be governed by the position of the auxiliary coil with respect to the receiving coil, the size and other physical properties of the auxiliary coil, and the magnitude and phase of the current passing through the coil. These variables may be so regulated that for a given aircraft and a given electromagnetic survey installation, the compensating field created at the receiving coil by the auxiliary coil will effectively cancel out the "imaginary" or out of phase component $D_i$ of the disturbing field at the receiving coil caused by the metal mass.

Alternatively, as suggested above, an auxiliary coil or a mass of conductive material may be energized by being so situated in the primary field that a compensating field will then be induced which at the receiving coil will again cancel out the "imaginary" component of the disturbing field. In this case, the magnitude, phase, and direction in space of the compensating field is determined by the physical properties of the auxiliary coil or conductive mass and its position in the primary field. These two variables may again be adjusted to provide compensation for the "imaginary" or out of phase component of the disturbing field in any given aircraft and electromagnetic survey installation. It will be appreciated that if desired for any practical reason, such as the use of more than one transmitting frequency or any difficulty of orientating a single auxiliary coil with respect to the transmitting coil, more than one auxiliary coil may be employed. These auxiliary coils may occupy positions of varying angular relationship with respect to each other. For example, three mutually perpendicular coils may be employed in which case the position of the coils may be fixed before compensation is attempted and the compensation then effected by varying only the current passing through the coils.

As mentioned above, our invention also contemplates an improvement in existing airborne electromagnetic survey devices whereby, for towing the bird, there may be used a thinner and less expensive cable than is conventionally used, and the receiving coil in the bird is thus operated more nearly vertically beneath the aircraft, with its attendant advantages of permitting operation of the bird closer to the ground and improved location of conductive bodies.

According to this feature of our invention, the signals from the receiving coil or coils are transmitted to the detecting, separating and measuring means in the aircraft not through a plurality of electrical conductors as has heretofore been the case, but rather by means of a radio transmitter located in the bird and a corresponding apparatus located in the aircraft in conjunction with the said detecting, separating and measuring means. Such transmitters and receivers are well-known in the art and do not per se constitute part of our invention.

This, eliminating as it does the necessity for physical electrical connection between bird and aircraft, permits the use of a standard thin cable, the only limiting factor being the strength required for towing the bird. The cable may be substantially smaller in cross-section than the usual cables, thus creating less wind resistance and drag than has heretofore been the case and in normal operation the bird operates much more closely to the vertical with respect to the aircraft than formerly.

While we have described above several embodiments of our invention, it is to be understood that such description is offered by way of illustration only and not as a limitation. Such embodiments of our invention as come within this scope and purview of the appended claims are to be considered as part of this invention.

We claim:

1. The method of electromagnetic prospecting which comprises transmitting from a transmitting coil in an aircraft a primary alternating electromagnetic field, thus setting up a secondary alternating electromagnetic field due to conductive ore bodies and other conductive bodies and formations and also setting up a disturbing alternating electromagnetic field due to conductive masses of the aircraft near the transmitting coil, eliminating the detrimental effect of the disturbing field by setting up by means of an additional conductor near the transmitting coil an alternating electromagnetic field which nullifies any component of the disturbing field that is out of phase with the primary field, receiving in a receiving coil the resultant electromagnetic signals of said fields, and measuring characteristics of the received signals.

2. The method claimed in claim 1, in which the detrimental effect of the disturbing field is cancelled by adjusting the electromagnetic field of the additional conductor when the aircraft is located at a place where there is negligible secondary electromagnetic field.

3. In the method of electromagnetic prospecting which comprises transmitting from a transmitting coil in an aircraft a primary alternating electromagnetic field, receiving in a receiving coil resultant electromagnetic signals, and measuring characteristics of the received signals, the improvement which comprises eliminating the detrimental effect of a disturbing field, caused by conductive masses of the aircraft, by producing a compensating field which nullifies at the receiving coil any component of the disturbing field that is out of phase with the primary field.

4. The improvement claimed in claim 3, in which said out of phase component is nullified by making the compensating field at the receiving coil equal in magnitude and opposite in direction in space to said component.

5. The improvement claimed in claim 3, in which the compensating field is produced by causing alternating current to flow in an additional conductor near the transmitting coil.

6. The method of electromagnetic prospecting which comprises transmitting from a transmitting coil in an aircraft a primary alternating electromagnetic field, eliminating the detrimental effect of a disturbing field, due to the presence of conductive masses of the aircraft, by transmitting from an auxiliary coil in the aircraft a compensating field and by adjusting the compensating field to nullify at a receiving coil any component of the disturbing field that is out of phase with the primary field, receiving in the receiving coil electromagnetic signals due at least in part to the presence of conductive ore bodies and other conductive bodies and formations, and measuring characteristics of the received signals.

7. The method claimed in claim 6, in which the compensating field is transmitted by passing an alternating current through the auxiliary coil and is adjusted by regulating said current.

8. The method claimed in claim 7, in which the compensating field is further adjusted by adjusting the position of the auxiliary coil relative to the disturbing conductive masses of the aircraft.

9. In the method of claim 3, the additional improvement which comprises towing the receiving coil from the aircraft by means of a wire or cable of substantially the minimum cross-sectional dimensions required to support and tow the receiving coil whereby the receiving coil is suspended as nearly vertically below the aircraft as possible, transmitting by radio from the receiving coil to the aircraft the signals received in the receiving coil, and measuring in the aircraft said characteristics of the signals.

10. The method of electromagnetic prospecting which comprises transmitting from a transmitting coil in an aircraft a primary alternating electromagnetic field, thus setting up, due to conductive ore bodies and other conductive bodies and formations, a secondary alternating electromagnetic field which indicates geophysical anomalies due to the conductive ore bodies and other bodies and formations, towing a receiving coil from the aircraft by means of a wire or cable of substantially the minimum cross-sectional dimensions required to support and tow the receiving coil whereby the receiving coil is suspended as nearly vertically below the aircraft as possible, receiving in the receiving coil signals caused by the primary and secondary fields, transmitting the signals by radio from the receiving coil to the aircraft, and measuring in the aircraft the geophysical anomalies indicated by the signals.

11. Apparatus for electromagnetic prospecting comprising an aircraft, electromagnetic signal transmitting means in the aircraft and including a transmitting coil and a source of alternating current in circuit with the transmitting coil for energizing the transmitting coil to set up a primary alternating electromagnetic field extending beyond the aircraft, conductive masses of the aircraft being located in the field of the transmitting coil whereby they set up a disturbing alternating electromagnetic field, electromagnetic signal receiving means including a receiving coil and measuring means coupled to the receiving coil, and an auxiliary conductor in the aircraft and coupled to the signal transmitting means whereby an electric current flows therein, the size and other physical properties and the location of the auxiliary conductor being such that said electric current sets up an electromagnetic field which at the receiving coil is equal in magnitude and opposite in direction in space to any component of the disturbing field that is out of phase with the primary field.

12. Apparatus as claimed in claim 11, in which the auxiliary conductor comprises an auxiliary coil connected to the source of alternating current, and in which means are provided for regulating the electric current through the auxiliary coil.

13. Apparatus as claimed in claim 11, in which the auxiliary conductor comprises a plurality of auxiliary coils connected to the source of alternating current, and in which means are provided for regulating the electric current through the auxiliary coils.

14. Apparatus as claimed in claim 11, in which the auxiliary conductor is inductively coupled to the transmitting coil and is not connected to the source of alternating current.

15. Apparatus as claimed in claim 11, in which the receiving coil is in a bird outside the aircraft, a wire or cable connecting the bird to the aircraft, the wire or cable being of substantially the minimum cross-sectional dimensions required to support and tow the bird from the aircraft, and in which the electromagnetic signal receiving means includes a radio transmitter located in the bird and connected to the receiving coil to transmit radio signals to the aircraft, and a radio receiver located in the aircraft, the measuring means being located in the aircraft and in circuit with the radio receiver and the transmitting coil for detecting anomalies in the received signals.

16. Apparatus for electromagnetic prospecting comprising an aircraft, a transmitting coil in the aircraft, a source of alternating current in the aircraft and in circuit with the transmitting coil for energizing the transmitting coil to set up a primary alternating electromagnetic field extending beyond the aircraft, a bird outside the aircraft, a wire or cable connecting the bird to the aircraft, the wire or cable being of substantially the minimum cross-sectional dimensions required to support and tow the bird from the aircraft, a receiving coil in the bird, a radio transmitter in the bird and in circuit with the receiving coil for sending signals from the receiving coil to the aircraft, a radio receiver in the aircraft, and measuring means in the aircraft and in circuit with the radio receiver and the transmitting coil for detecting anomalies in said signals.

References Cited in the file of this patent

UNITED STATES PATENTS

| | | |
|---|---|---|
| 2,200,070 | Aiken | Nov. 5, 1940 |
| 2,608,602 | Muffly | Aug. 26, 1952 |
| 2,652,530 | Davidson | Sept. 15, 1953 |
| 2,692,970 | Tolles | Oct. 26, 1954 |